United States Patent [19]

Legge et al.

[11] Patent Number: 4,948,357
[45] Date of Patent: Aug. 14, 1990

[54] DRAPED PARISON BLOW MOLDING APPARATUS

[75] Inventors: Richard C. Legge, Pittsford; George F. Arp, Fairport, both of N.Y.

[73] Assignee: John D. Brush & Co., Inc., Rochester, N.Y.

[21] Appl. No.: 335,576

[22] Filed: Apr. 10, 1989

Related U.S. Application Data

[62] Division of Ser. No. 868,294, May 28, 1986, Pat. No. 4,828,786.

[51] Int. Cl.⁵ .............................................. B29C 49/04
[52] U.S. Cl. ..................................... 425/522; 220/68; 425/97; 425/528; 425/531; 425/532
[58] Field of Search ................ 425/72.1, 90, 296, 102, 425/297, 104, 302.1, 305.1, 527, 531, 532, 525, 529, 528, 522; 264/515, 536, 526, 529, 540, 531, 532, 528, 537, 539, 540, 541; 215/1 C; 220/68

[56] References Cited

U.S. PATENT DOCUMENTS

| | | | |
|---|---|---|---|
| 3,275,726 | 9/1966 | Rudolph | 264/529 |
| 3,334,164 | 8/1967 | Samuels et al. | 264/526 |
| 3,372,429 | 3/1968 | Kato | 425/532 |
| 3,452,125 | 6/1969 | Schurman et al. | 264/521 |
| 3,579,622 | 5/1971 | Shaw et al. | 264/531 |
| 3,636,151 | 1/1972 | Nagai | 264/526 |
| 3,736,201 | 5/1973 | Teraoka | 264/221 X |
| 3,806,587 | 4/1974 | Turner | 425/531 |
| 3,861,845 | 1/1975 | Butcher | 425/531 |
| 3,865,531 | 2/1975 | Moore et al. | 425/525 |
| 3,944,643 | 3/1976 | Sato et al. | 264/532 |
| 4,029,234 | 6/1977 | Johnson, Jr. et al. | 264/299 X |
| 4,035,461 | 7/1977 | Korth | 425/536 X |
| 4,423,000 | 12/1983 | Teraoka | 264/524 |
| 4,510,116 | 4/1985 | Peters et al. | 264/529 |
| 4,550,008 | 10/1985 | Shimizu | 264/527 |
| 4,584,158 | 4/1986 | Nilsson et al. | 264/529 |
| 4,805,290 | 2/1989 | Brush, Jr. et al. | 264/523 X |

FOREIGN PATENT DOCUMENTS 58-203022 11/1983 Japan .
911228 11/1962 United Kingdom ................ 264/536

Primary Examiner—Richard L. Chiesa
Attorney, Agent, or Firm—Stonebraker, Shepard & Stephens

[57] ABSTRACT

A double-walled plastic box (20) is molded from a single parison (50) in an unlimited depth by closing the bottom of parison (50) and draping it downwardly over a core (60) so that a leading part of the parison forms an inside wall of the box and a following part of the parison forms an outside wall of the box. After parison (50) is draped over core (60), outer mold parts (61) close around the core and the draped parison; and the box is blown in a cavity between the core and the outer mold parts. The parison can be ballooned while draping down over the core to enlarge the parison to stand out from and surround the core, which can be raised during the draping process. Parison (50) can also be deballooned after draping to stay within the confines of outer mold parts (61) while core (60) raises and while the outer mold parts close.

21 Claims, 8 Drawing Sheets

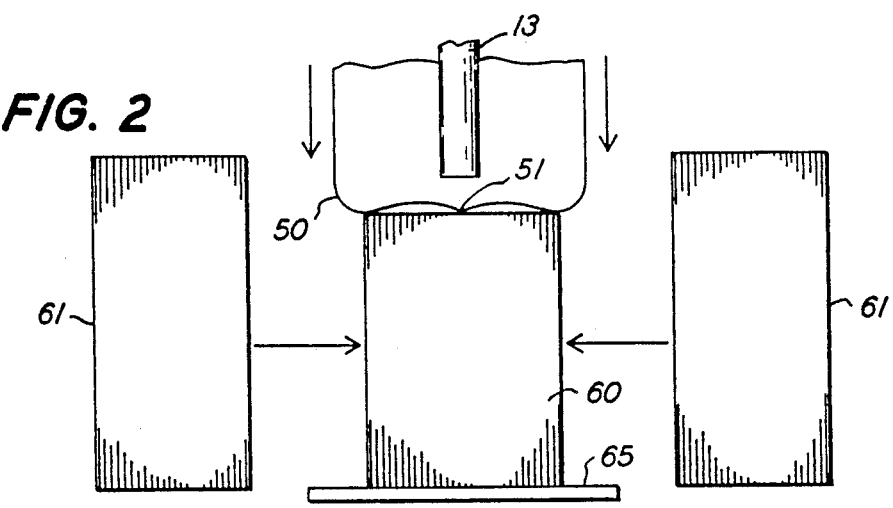
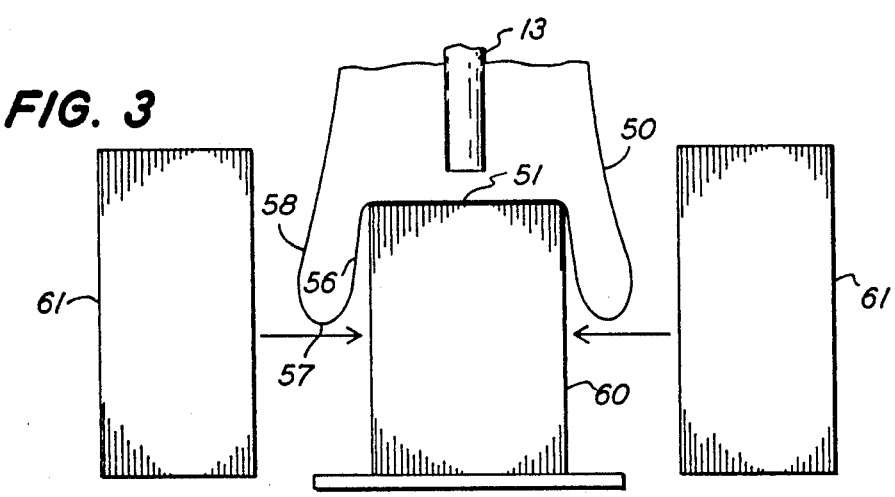
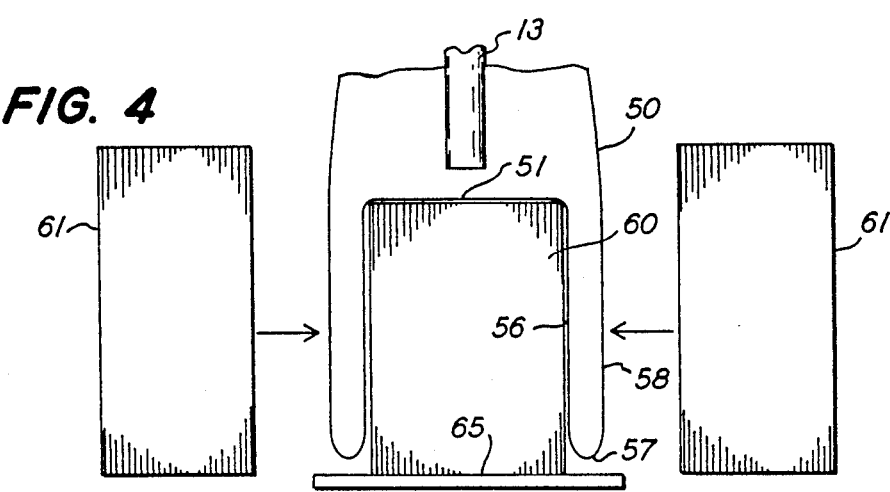

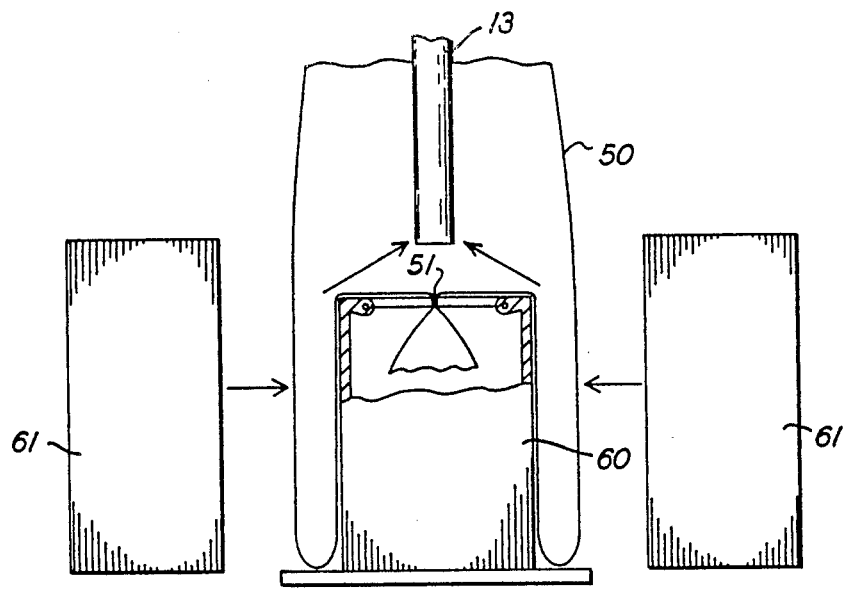
FIG. 11
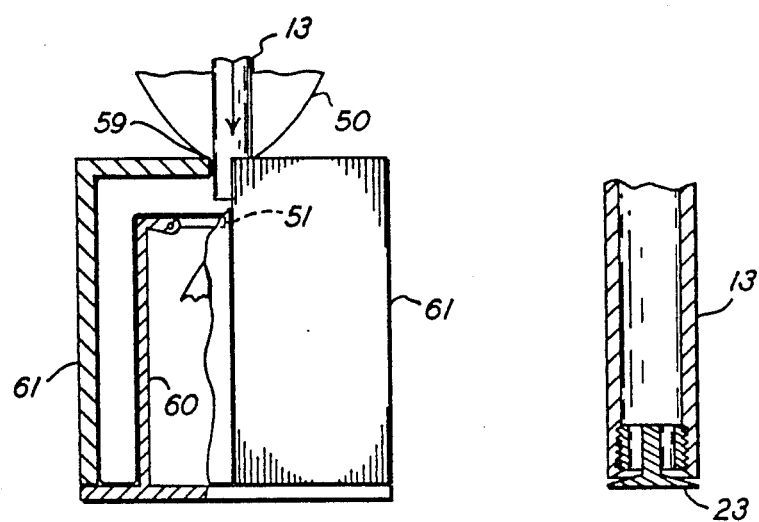 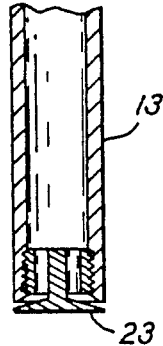
FIG. 12  FIG. 13

DRAPED PARISON BLOW MOLDING APPARATUS

RELATED APPLICATIONS

This application is a division of allowed parent application Ser. No. 868294, filed 28 May 1986, entitled "Draped Parison Blow Molding," now U.S. Pat. No. 4828786 issued 9 May 1989.

BACKGROUND

The most efficient way of molding double-walled boxes has been to blow mold them from a single parison formed laterally into a molding space between a cavity and core. This limits the depth of such boxes to one-half their width. Greater depths for blow molded double-walled boxes have long been sought, and the need for this has produced several suggestions. Nagai U.S. Pat. No. 3,636,151 suggests two parisons arranged side by side and blown into box halves joined together along a seam line; and U.S. Pat. application Ser. Nos. 827,865 and 828,243 (both abandoned), assigned to the assignee of this application, suggest a way of blow molding deep, double-walled boxes in two parts that are later joined together. In both of these solutions, the production measures relating to the seam lines add to the expense of the boxes.

We have discovered a way that a deep, double-walled box can be blow molded from a single parison that is closed and draped downward over a core so that a leading portion, next to the core, becomes an inside wall of the box; and a succeeding portion, surrounding the core, becomes an outside wall of the box. Outer mold parts then close around the parison draped over the core, and the parison is blown in the cavity between the core and the outer mold parts to form a double-walled box that is unlimited in depth.

Our invention seeks economical, effective, and reliable blow molding of double-walled boxes that are unlimited in depth and are blown in a single piece from a single parison. Our way of accomplishing this includes molding methods and equipment and results in a uniquely formed, double-walled box. Although our way of making deep, double-walled boxes was to satisfy a need for blow molded boxes having interwall spaces that can be filled with a concrete type of fire resistant insulation material, our invention is not limited to such uses and can be applied to deep, double-walled boxes made for other purposes, such as thermally insulated ice chests, for example. Also, although this application refers to the blown product as a "box", it need not have a box shape or be rectangular in cross section; and it can have a circular, elliptical, or other cross section for a shape that might not ordinarily be called a "box". Regardless of the shape, however, the blown product is double walled, relatively deep from its bottom to its open end, and formed of a single parison draped over a core.

SUMMARY OF THE INVENTION

Our way of blow molding a single parison into a deep, double-walled box includes: closing a lower region of the parison; lowering the closed parison over a core for the box so that a leading region of the parison drapes down over the core and a trailing region of the parison stands off from the core; closing outer mold parts together around the core and the parison draped over the core so that the outer mold parts can form an outer wall of the box while the core forms an inner wall of the box; and blowing the parison between the core and the outer mold parts. As the closed parison drapes over the core, it can be ballooned by air from a blow pin so that the ballooned parison surrounds and stands off from the core. The core can be raised as the parison drapes down over it, and the core can be lowered for removing the blown box from the mold. Our improvements in blow molding equip- ment can accomplish all these functions and produce a deep, double-walled box having a leading parison pinch-off region formed on an inside wall of the box in the deepest part of the box, from which resin material extends along the inside wall of the box to the open side of the box and thence along the outside wall of the box to a following pinch-off region spaced opposite to and nearby the leading pinch-off region.

DRAWINGS

FIGS. 1–6 are schematic views showing successive steps preferably used in our blow molding equipment and methods for forming a deep, double-walled box;

FIGS. 7–12 are schematic views, similar to the views of FIGS. 1–6, showing portions of alternative preferred molding methods and equipment for forming deep, double-walled boxes;

FIG. 13 is a partially schematic, fragmentary view of a blow pin for use in the blow molding methods and equipment of FIGS. 1–12.

DETAILED DESCRIPTION

Figure 1:
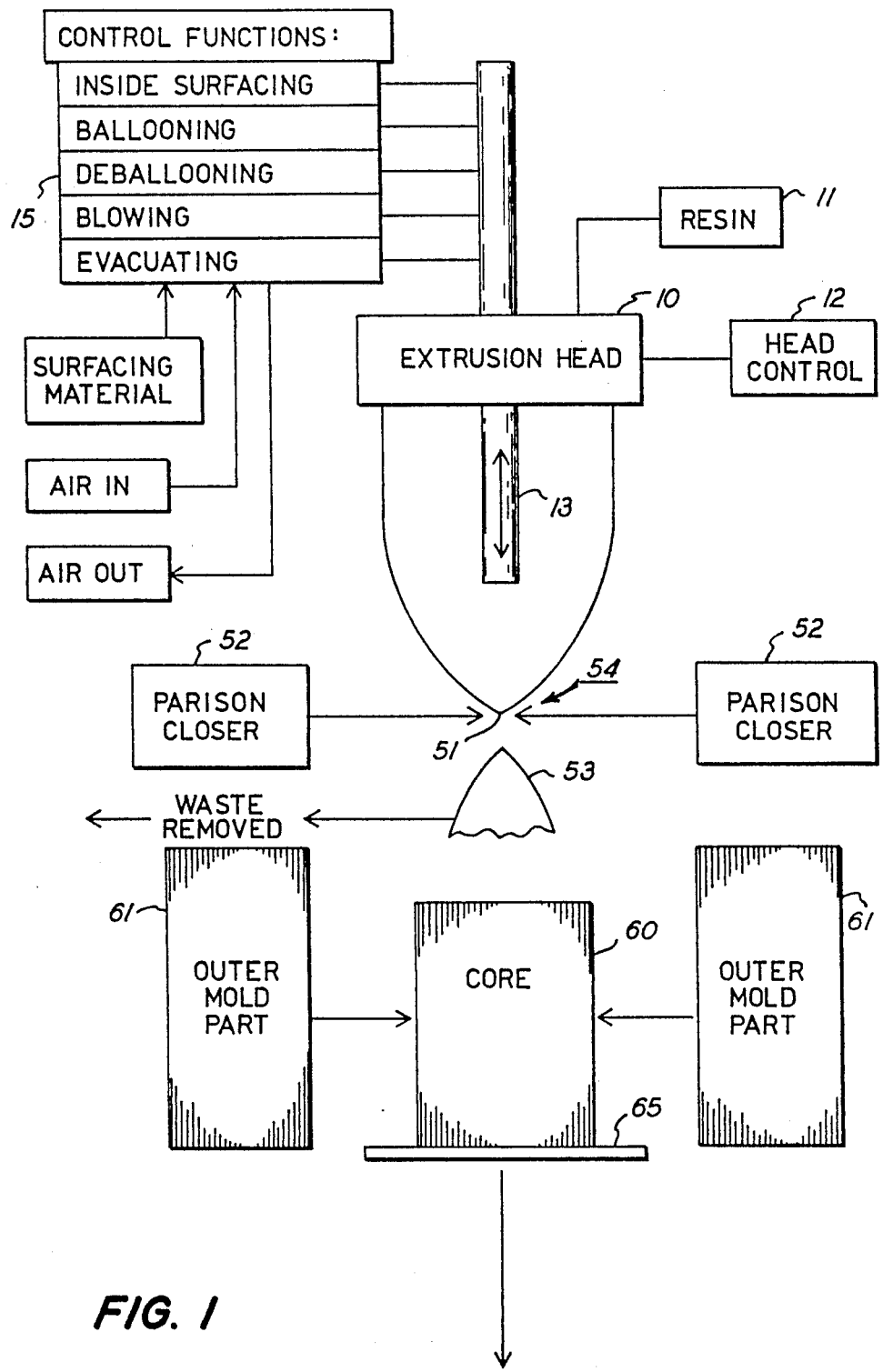

A machine for blow molding deep, double-walled boxes according to our invention preferably includes some special functions that are shown in FIG. 1 and not repeated in the other figures. The extrusion head 10 is fed with plasticized resin from a source 11 that can include an accumulator (not shown), and a head control 12 regulates the lowering of a parison 50 from extrusion head 10. Blow pin 13, arranged within parison 50, is preferably movable vertically relative to head 10. Also provided, preferably via blow pin 13, are control functions 15, involving air movement in and out of parison 50, and coating the inside surface of parison 50 with a material that prevents it from sticking to itself. These control functions include: delivering the surfacing material at the proper time for coating a region of the inside surface of parison 50 that might contact itself; delivering air to the interior of the closed parison for ballooning it to a large enough size to surround core 60 during draping; deballooning parison 50 by evacuating some of its interior air to reduce the ballooned size of the parison; blowing the parison between core 60 and outer mold parts 61 for shaping the parison to the mold cavity; and evacuating air from the blown box to facilitate its separation from mold parts.

In the blow molding sequence illustrated in FIGS. 1–6, a lower region 54 of parison 50 is closed by sticking or fusing the parison wall to itself with a pair of opposed parison closers 52. These can have various forms, including opposed bars that press toward each other to flatten parison 50 and stick the parison wall to itself, forming a closed seam or pinch-off 51. Parison closers 52 can also cut away and remove a waste portion 53 from below pinch-off 51; and by folding or compressing the parison wall, the parison closers can shorten the length of pinch-off seam 51 if necessary. Once the lower region 54 of parison 50 is closed, it lowers onto the top of core 60, as shown in FIG. 2, where it will form the bottom of the inside wall of the deepest part of the box.

As parison 50 lowers further, it begins draping over the sides of core 60 as shown in FIGS. 3 and 4. To do this, parison 50 is preferably larger than core 60 so that a leading region 56 of parison 50 drapes over the top of core 60 and down the sides of core 60 to an advancing inversion region 57 leading into a succeeding region 58 that surrounds and stands off from core 60 and leading region 56. When fully draped, as shown in FIG. 4, the inversion region 57 is adjacent a flange 65 on core 60 where it will form an open end of the molded box.

Figure 5:
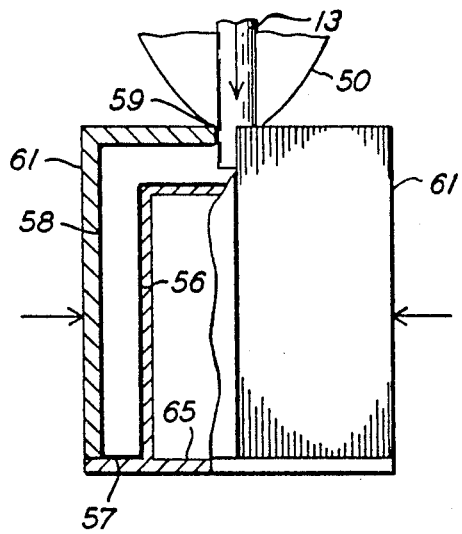
Figure 6:
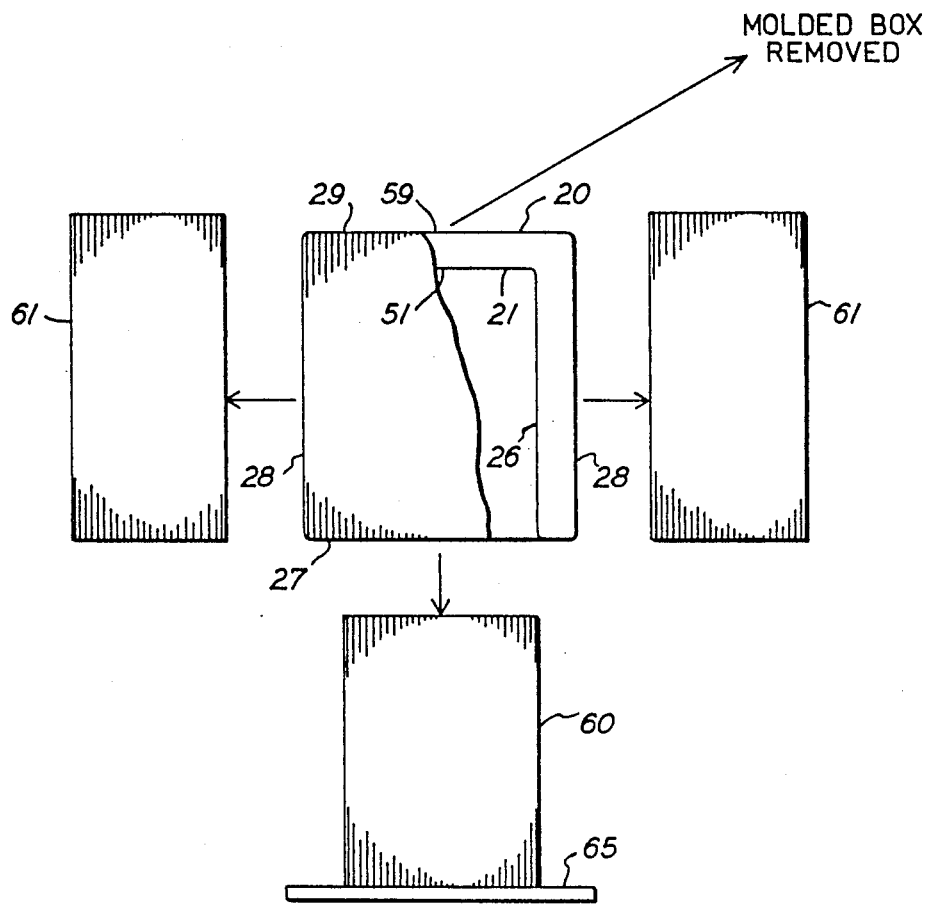

Then outer mold parts 61 close together around draped parison 50 and core 60, as shown in FIG. 5, to enclose the draped parison within a cavity between core 60 and outer mold parts 61. The closure of outer mold parts 61 pinches off a trailing or following portion 59 of parison 50 at the outside of the bottom wall of the box to be blown, in the region of blow pin 13. Blowing air then blows the draped parison into a deep, double-walled box shaped to conform to the cavity between core 60 and outer mold parts 61. After the blown resin has set, outer mold parts 61 are opened up and the blown box 20 is removed from the machine. This can be facilitated by evacuating air through blow pin 13 to flex the box walls slightly inward and ease their release from mold surfaces. Also, box 20 can be removed by lifting it upward from core 60, either with core 60 remaining in place or with core 60 lowered relative to outer mold parts 61 as suggested in FIG. 6. High pressure air can be supplied to the top of core 60 to blow upward against box 20 and help loosen it from core 60 for removal from the molding machine. The molded box 20, beginning with leading pinch-off 51 on inside bottom wall 21 at the deepest part of the box, has an inside wall 26, a wall 27 around the open end of the box, an outside wall 28 spaced from inside wall 26, and an outside bottom wall 29, spaced from inside bottom wall 21 and terminating at trailing pinch-off 59.

Our invention includes many variations on the relatively simple embodiment illustrated in FIGS. 1-6, and some of these possibilities are shown in FIGS. 7-12. All the capabilities and controls explained relative to FIG. 1 are preferably included, but not illustrated, for the sequence illustrated in FIGS. 7-12. The differences in the sequence of FIGS. 7-12 involve holding the closed parison at the top of core 60 while the parison is draped, and ballooning the parison to enlarge its diameter during draping.

Figure 7:
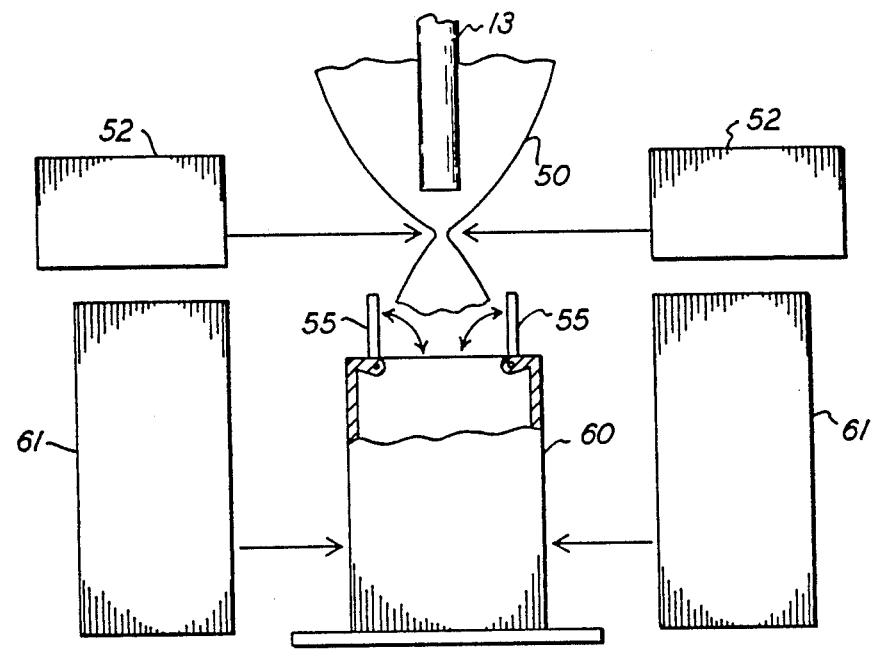
Figure 8:
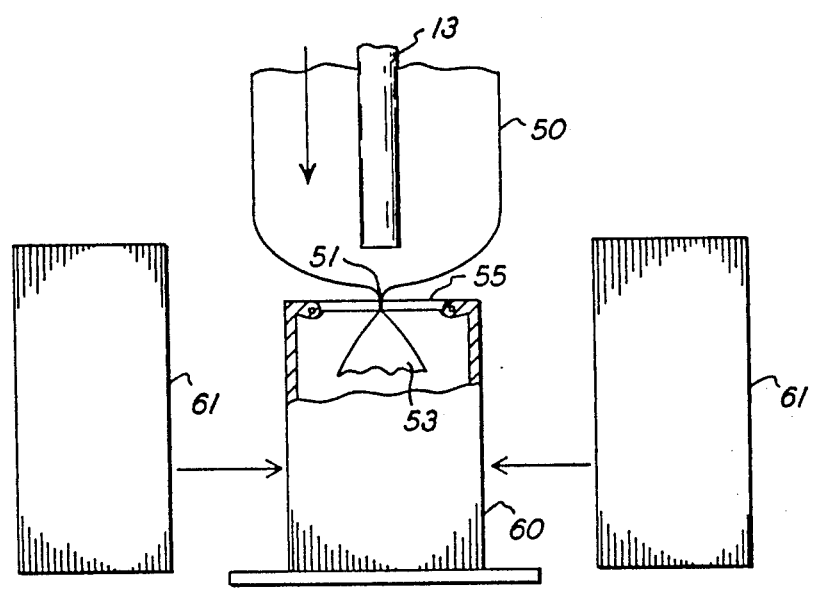

The holding of the closed parison is accomplished by clamp jaws 55 that are open and separated in FIG. 7 and pivoted together in FIG. 8 to pinch off and hold parison 50, a lower region of which extends below the top of core 60 into a hollow interior of core 60. Clamps 55 are preferably shaped to form part of the top of core 60 when closed as shown in FIG. 8, and they are preferably hinged and driven between open and closed positions. Parison closers 52 can also be used to draw together and reduce the dimension of a lower region of parison 50 so that it fits readily between open clamp jaws 55. A downward air blast from blow pin 13 through the open bottom of parison 50 can also accomplish this without assistance from parison closers 52. Closing of clamp jaws 55, as shown in FIG. 8, not only closes parison 50 at pinch-off region 51, but also holds parison 50 in place during draping. Waste resin 53 from the closed end of parison 50 hangs within hollow core 60 and is removed, either during the molding process or after the blown box leaves the molding machine.

Figure 9:
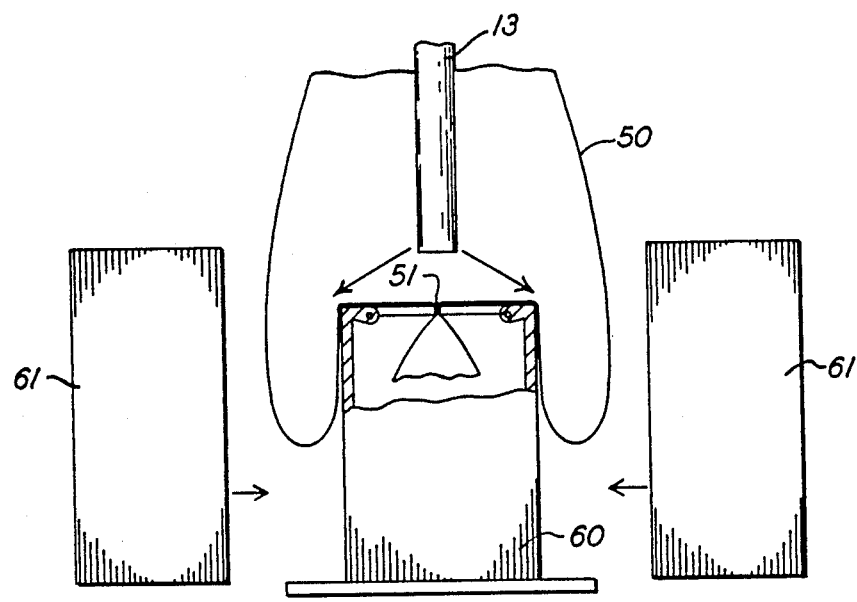
Figure 10:
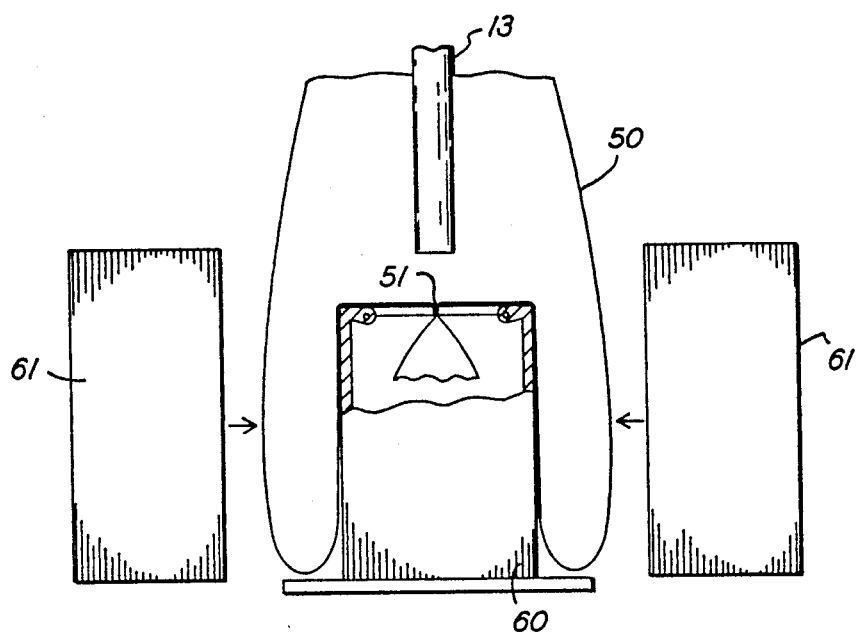

In the sequence of FIGS. 7-12, parison 50 is not initially large enough to surround core 60, but is ballooned to a larger size as shown in FIGS. 9 and 10 as it drapes down over core 60. During this process, the inside surface of ballooned parison 50 is preferably coated with a material that prevents that surface from sticking to itself on contact. Materials that succeed at this include oily, slippery materials such as vegetable oils and small particles such as powered inorganic material. A likely place for contact to occur between the inside walls of parison 50 is at the upper corners of core 60 as shown in FIG. 11.

Ballooned parison 50 can reach a larger size than the cavity space available within outer mold parts 61, and this can result in pinching off portions of the outer parison wall as outer mold parts 61 close. One way to avoid this is to enlarge the number of outer mold parts—from two to four, for example—so that outer mold parts move inward in four directions upon the ballooned parison. Another possibility, that we prefer, is to deballoon the parison, as shown in FIG. 11, by evacuating some of its internal air outward through blow pin 13 before closing outer mold parts 61. This shrinks parison 50 back down to a size that fits within outer mold parts 61. As these close around the deballooned parison, they pinch off a trailing parison region 59 at the outer wall of the box opposite the leading pinch-off region 51 on the inner wall of the box, as shown in FIG. 12. Then, the box is blown, the mold parts are opened, and the box is removed from the mold and trimmed of any waste material, such as pinch-off waste 53. These operations are similar to those previously described and schematically illustrated in FIG. 6.

The lower end of blow pin 13 can be provided with a diverter 23, as shown in FIG. 13, for diverting downwardly flowing fluid laterally outward to direct nonstick coating material against the inside surface of parison 50. There are other ways of depositing material on the inside surface of the parison, and coating material need not necessarily be directed against the parison wall from the blow pin.

Figure 14:
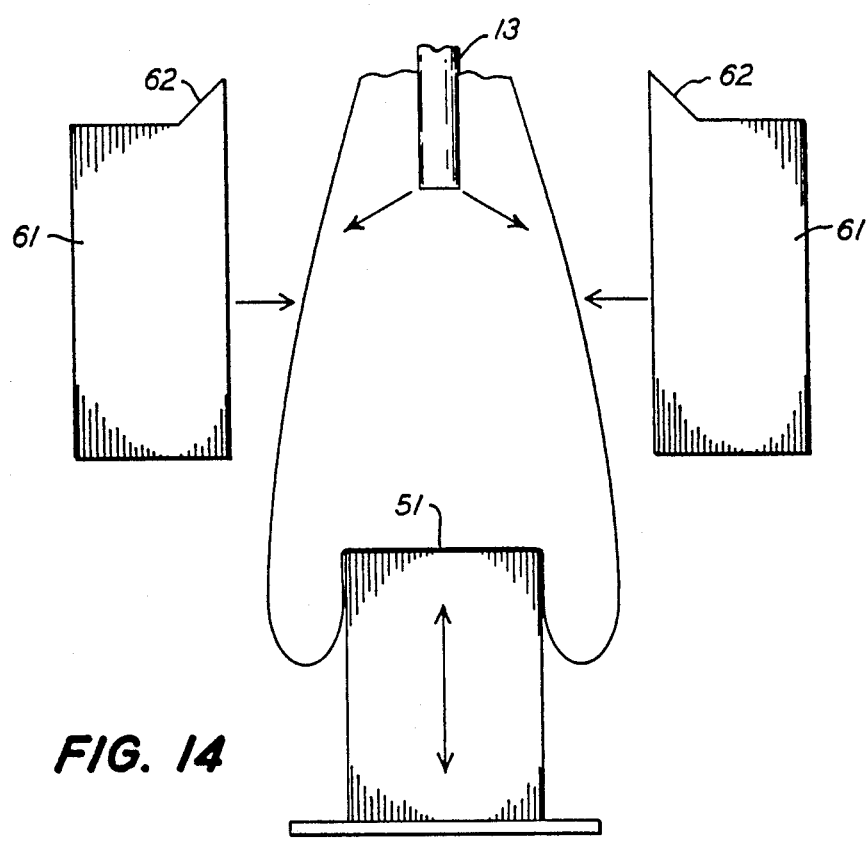
FIGS. 14–17 are schematic views of successive steps of another preferred variation of our blow molding methods and equipment for forming deep, double-walled boxes.
Figure 15:
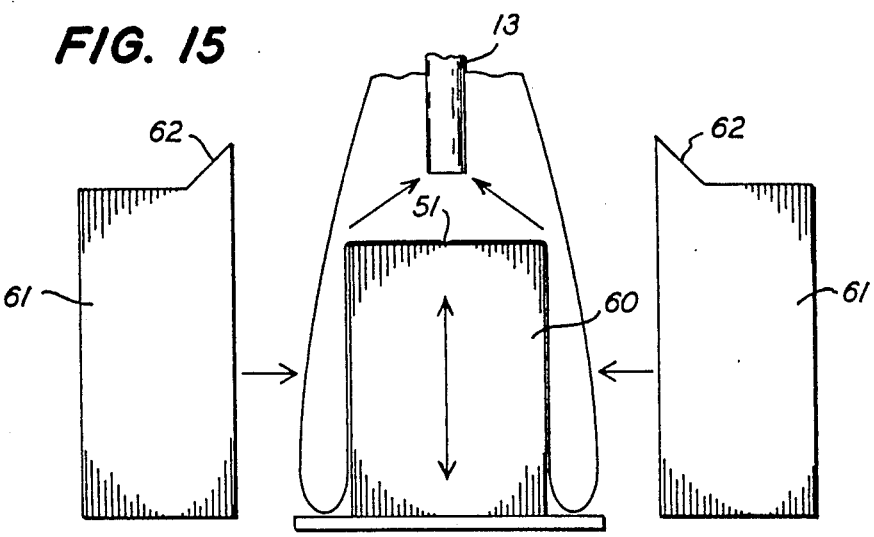
Figure 16:
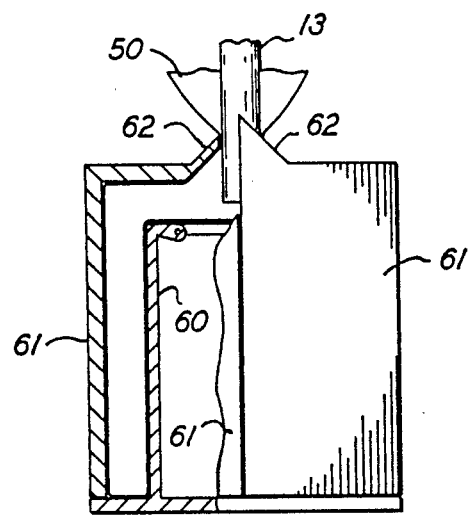
Figure 17:
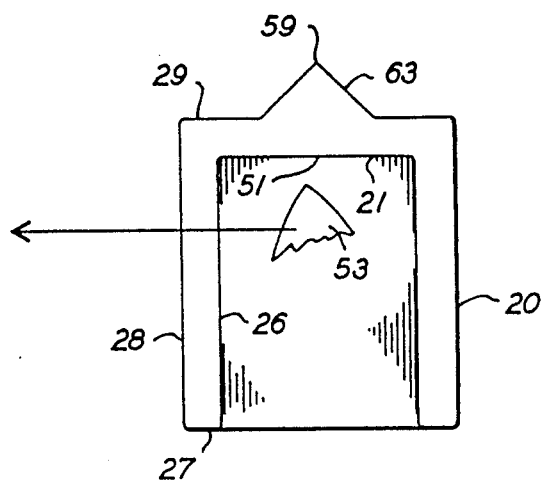

FIGS. 14 and 15 illustrate the raising of core 60 from a level below outer mold parts 61 up to the level of mold parts 61 during the draping process. This allows parison 50 to be lowered down through the space between the outer mold parts to the top of core 60 where it begins to drape over upper regions of core 60, before core 60 raises to the position of FIG. 15. Parison 50 is deballooned as core 60 rises so that the parison is not over inflated as its interior space is reduced by the rising core. Outer mold parts 61 can be closed around the parison while core 60 rises so that the parison is confined within the cavity formed by the closed outer mold parts. It is also possible to raise core 60 into the deballooned parison before closing outer mold parts 61. When core 60 reaches the level of outer mold parts 61, the parison is completely draped over the core and is ready for molding. Surfacing material coated on the inside of parison 50, as previously described, prevents parison surfaces from sticking to each other if they touch at the upper corners of core 60 while the core is rising and the parison is deballooning.

Outer mold parts 61 of FIGS. 14 and 15 have a roof configuration 62 that forms a roof shape 63 at the bottom of the outside wall 29 of box 20. This also pinches off parison 50 at a higher level 59 spaced a little farther from leading pinch-off region 51 on the inside wall 21 at the bottom of box 20. Roof region 63 can form a filling reservoir for filling the interwall space of box 20.

We have found in practice that a parison distance from leading pinch-off region 51 to following pinch-off 59 at roof region 63 can be eight feet long; and throughout this length, the inner and outer walls of the box can be separated by less than two inches. Boxes made according to our invention can be as deep as desirable, within practical limits of managing the draping of a heavy, plasticized parison. Double-walled boxes, blow molded our way, can have walls that are nearly uniform in thickness and perform sturdily and reliably in the finished box. Use of a single parison for blow molding a deep, double-walled box without any seams or unions also simplifies the box-forming process.

We claim:

1. Apparatus for blow molding a deep, double-walled box formed from a single parison, said blow molding apparatus including an extrusion head, a core shaped to form an inside wall of said box, and outer mold parts shaped to form an outside wall of said box, said blow molding apparatus comprising:
   a. said core being positioned below said extrusion head so that a lower region of parison can descend to engage an upper region of said core;
   b. a holder arranged on said upper region of said core for holding a closed lower region of said parison so that a portion of the weight of said descending parison rests on said upper region of said core, as said parison continues to descend from said extrusion head;
   c. a programmable controller for said extrusion head, said controller being programmed for descending said parison down over said core so that a leading region of said parison drapes down around said sides of said core to form an inner wall of said box, an inversion region of said parison drapes down to a lower region of said core to form an open end of said box, and a succeeding region of said parison drapes around said leading region to form an outer wall of said box;
   d. means for closing said outer mold parts around said core to surround said parison draped over said core and enclose said draped parison in a cavity formed between said core and said outer mold parts; and
   e. means for blowing said parison to form said deep, double-walled box to the shape of said cavity between said core and said outer mold parts.

2. The apparatus of claim 1 including means for lowering said core relative to said outer mold parts for removing said deep, double-walled box from said cavity.

3. The apparatus of claim 1 including means for ballooning said closed parison while draping said parison over said core.

4. The apparatus of claim 3 including means for deballooning said parison before closing said cavity.

5. The apparatus of claim 1 wherein said core has a flange disposed for bridging a space to said outer mold parts to support said inversion region of said parison around said open end of said box when said cavity is closed.

6. The apparatus of claim 1 wherein said parison holder is a clamp arranged on said upper region of said core for closing and holding said lower region of said parison.

7. The apparatus of claim 6 wherein said core has a hollow interior below said upper region, and a waste portion of said lower region of said parison extends into said hollow interior beyond said holder on said upper region of said core.

8. The apparatus of claim 6 including means for ballooning said closed parison while lowering said parison relative to said core.

9. The apparatus of claim 8 including means for deballooning said parison before closing said cavity.

10. A draped parison blow molding apparatus including an extrusion head, a core, and outer mold parts closeable around said core, said apparatus comprising:
    a. said core being spaced below said extrusion head by a distance substantially less than the full length of a parison descending from said extrusion head;
    b. a clamp arranged on an upper region of said core for closing and holding a lower region of said parison descended from said extrusion head to said upper region of said core;
    c. said upper region of said core being arranged for partially supporting the weight of said descending parison as said extrusion head lowers an inversion region of said parison downward around sides of said core so that a succeeding region of said parison extends around a preceding region of said parison disposed against the sides of said core;
    d. means for closing said outer mold parts around said core after said parison is draped downward around said sides of said core; and
    e. means for blowing said draped parison between said core and said outer mold parts closed around said core for forming said parison into the shape of a deep, double-walled box.

11. The blow molding apparatus of claim 10 wherein said core has a flange that extends outward from said side walls to receive said inversion region when said parison is fully descended over said core.

12. The blow molding apparatus of claim 10 including means for ballooning said parison before said inversion region lowers around said core.

13. The blow molding apparatus of claim 12 including means for deballooning said parison after draping said parison over said core, and before closing said outer mold parts.

14. The blow molding apparatus of claim 10 wherein said clamp at said upper region of said core opens into a hollow interior of said core so that said lower region of sad parison can descend through said clamp, below said upper region of said core and into said hollow interior of said core, where said lower region is clamped off and separated by said clamp from said preceding region of said parison that drapes over said clamp at said upper region of said core and down around said sides of said core.

15. The blow molding apparatus of claim 14 wherein said core has a flange extending outward from said core to receive said inversion region of said parison.

16. Apparatus including an extrusion head, a core, and outer mold parts closeable around said core for blow molding a deep, double-waled box, said apparatus including:
    a. a parison pinch-off clamp arranged on an upper region of said core for closing a lower region of a blow molding parison descended from said extrusion head to said core, said pinch-off clamp, when closed for holding said parison, forming an upper surface of said core;

b. means for causing relative movement between said parison and said core, while said lower region of said parison is held by said clamp at said upper region of said core, for disposing a preceding region of said parison to extend over said upper region of said core and downward along sides of said core to form an inside wall of said box and disposing a succeeding region of said parison to extend around said core and said preceding region to form an outside wall of said box; and c. a flange extending outward around said core for engaging and supporting an inversion region of said parison, between said preceding and succeeding regions, around an open end of said box.

17. The apparatus of claim 16 including means for ballooning said parison to a diameter larger than a diagonal dimension of said core while causing said relative movement.

18. The apparatus of claim 17 including means for deballooning said parison before closing a cavity between said core and said outer mold parts.

19. The apparatus of claim 16 wherein said outer mold parts close to engage said flange around said core.

20. The apparatus of claim 16 wherein said core is hollow and a waste portion of said lower region of said parison extends below said pinch-off clamp on said upper region of said core and down into said hollow core.

21. The apparatus of claim 16 including means for lowering said core relative to said outer mold parts for removing said box.

* * * * *